US006996783B2

(12) United States Patent
Brown et al.

(10) Patent No.: US 6,996,783 B2
(45) Date of Patent: Feb. 7, 2006

(54) SELECTIVELY ADJUSTING TRANSPARENCY OF WINDOWS WITHIN A USER INTERFACE USING A FLASHLIGHT TOOL

(75) Inventors: Michael Wayne Brown, Georgetown, TX (US); Andrew Douglas Hately, Austin, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/059,092

(22) Filed: Jan. 28, 2002

(65) Prior Publication Data

US 2003/0142138 A1 Jul. 31, 2003

(51) Int. Cl.
 *G09G 5/00* (2006.01)
(52) U.S. Cl. ............... 715/790; 715/768; 715/974; 715/783
(58) Field of Classification Search .......... 345/797, 345/790, 794, 768, 833, 973, 974, 766, 786; 715/790, 768, 833, 974, 753
See application file for complete search history.

(56) References Cited

U.S. PATENT DOCUMENTS

| | | | | |
|---|---|---|---|---|
| 5,333,256 A | * | 7/1994 | Green et al. | 345/772 |
| 5,377,317 A | * | 12/1994 | Bates et al. | 345/789 |
| 5,463,775 A | | 10/1995 | DeWitt et al. | |
| 5,528,259 A | * | 6/1996 | Bates et al. | 345/676 |
| 5,572,672 A | | 11/1996 | Dewitt et al. | |
| 5,651,107 A | * | 7/1997 | Frank et al. | 345/768 |
| 5,706,448 A | * | 1/1998 | Blades | 345/834 |
| 5,764,229 A | | 6/1998 | Bennett | |
| 5,805,163 A | * | 9/1998 | Bagnas | 345/768 |
| 5,889,530 A | | 3/1999 | Findlay | |
| 5,892,511 A | * | 4/1999 | Gelsinger et al. | 345/794 |
| 5,999,191 A | | 12/1999 | Frank et al. | |
| 6,002,397 A | | 12/1999 | Jaaskelainen, Jr. | |
| 6,049,798 A | | 4/2000 | Bishop et al. | |
| 6,072,489 A | * | 6/2000 | Gough et al. | 345/803 |
| 6,661,426 B1 | * | 12/2003 | Jetha et al. | 345/629 |

FOREIGN PATENT DOCUMENTS

EP 0684542 A1 5/1995

OTHER PUBLICATIONS

Microsoft (R) Windows NT Task Manager, copyright 1998.*
IBM Technical Disclosure Bulletin "Pop-up Window Shadow" vol. 34, No. 6, Nov. 1991 pp. 42-43.
IBM Technical Disclosure Bulletin "Translucent Window Attribute" vol. 36, No. 06A, Jun. 1993 pp. 135-136.

(Continued)

*Primary Examiner*—John Cabeca
*Assistant Examiner*—Ting Zhou
(74) *Attorney, Agent, or Firm*—Marilyn Smith Dawkins; Amy J. Pattillo

(57) ABSTRACT

A method, system and program for selectively adjusting transparency of windows within a user interface are provided. An n-level is determined within a z-order of at least one displayable object from among multiple displayable objects distributed within the z-order. A transparency level is selectively adjusted of the at least one displayable object within a user interface positioned at the n-level within the z-order, such that the transparency level of the at least one displayable object is selectively adjusted without adjusting the z-order of the displayable objects.

20 Claims, 6 Drawing Sheets

OTHER PUBLICATIONS

IBM Technical Disclosure Bulletin "Translucent Windows: Dragging an Image without Obscuring the Desktop:", vol 37, No. 10, Oct. 1994 p. 15.

IBM Technical Disclosure Bulletin "Independent Pixel Interpretation of Windowed Overlays/Underlays" vol. 38, No. 09, Sep. 1995 pp. 365-367.

IBM Research Disclosure 411119 "Reducing Desktop Clutter in GUI" Jul. 1998 p. 995.

IBM Research Disclosure 41876 "Non-Intrusive Controls" Feb. 1999 pp. 247-249.

IBM Research Disclosure 431180 "Progressively Animated Graphical Overlays" Mar. 2000 p. 592.

IBM Displaying Specified Resource Usage.

IBM Displaying Transparent Resource Aids.

IBM Changing the Alpha Levels of an Application Window to Indicate a Status of a Computing Task.

IBM Adjusting the Tint of a Translucent Window to Convey Status.

IBM Adjusting Transparency of Windows to Reflect Recent Use.

IBM Displaying Transparency Characteristic Aids.

IBM Specifying Audio Output According to Window Graphical Characteristics.

IBM Automatic Window Representation Adjustment.

IBM Varying Heights of Application Images to Convey Application Status.

IBM Selectively Adjusting the Translucency of Windows in Response to a Scroll Wheel Rotation.

IBMSelectively Adjusting the Order of Windows in Response to a Scroll Wheel Rotation.

Make the Language Bar Transparent, 1 page, wysiwyg://fraContent.fraRightFrame.50/ht olbar_change_transparency.asp?frame=true.

TUCOWS Shell Enhancements Trans-XP, 2 pages, wysiwyg://20/http://www.tucows.com/system/preview/232626.html.

The Iconfactory: Your Quality Freeware Icons Hub (ibxp_home.asp), 2 pages, http://www.iconfactory.com/ibxp_home.asp.

Tweak_XP, 2 pages, http://www.totalidea.ce/transxp.htm.

Trans-XP Information, Details, and Download from VoodooFiles.com, 1 page, wysiwyg://15/http://www.voodoofiles.com/5817.

Cronosoft, 1 page, wysiwyg://26/http://www.cronosoft.com/download/qhwxp/index.htm.

Windows XP Home Page, 1 page, Wysiwyg://33/http://www.microsoft.com/windowssxp/default.asp.

* cited by examiner

| TRANSPARENCY SELECTIVITY FACTORS | 80 |

| ADD NEW | Z-ORDER CRITERIA | 82 |

CRITERIA #1                        TRANSPARENCY
CRITERIA #2                        TRANSPARENCY

| ADD NEW | N-LEVEL FLASHLIGHT | 84 |

BEAM #1
     BEAM SIZE
     BEAM SHAPE
     TRANSPARENCY

| ADD NEW | FLASHLIGHT CRITERIA | 89 |

CRITERIA #1                        TRANSPARENCY
CRITERIA #2                        TRANSPARENCY

FIGURE 8

SELECTIVELY ADJUSTING TRANSPARENCY OF WINDOWS WITHIN A USER INTERFACE USING A FLASHLIGHT TOOL (1) U.S. patent application Ser. No. 10/059,093 (now abandoned);
(4) U.S. patent application Ser. No. 10/059,027 (now abandoned);
(5) U.S. patent application Ser. No. 10/058,532 (now abandoned);
(7) U.S. patent application Ser. No. 10/058,397 (now abandoned);
(9) U.S. patent application Ser. No. 10/058,300 (now abandoned);
(11) U.S. patent application Ser. No. 10/058,599 (now abandoned).

BACKGROUND OF THE INVENTION

1. Technical Field

The present invention relates in general to computer systems and, in particular, to graphical user interfaces. Still more particularly, the present invention relates to selectively adjusting the transparency of windows within a user interface.

2. Description of the Related Art

Most operating systems provide a graphical user interface (GUI) for controlling a visual computer environment representing programs, files, and options with graphical images, such as icons, menus, and dialog boxes on the screen. Graphical items defined within the GUI work the same way across multiple software platforms because the GUI provides standard software routines to handle these elements and report the user's actions.

A typical graphical object defined by a GUI is a window or other defined area of a display containing distinguishable text, graphics, video, audio and other information for output. A display area may contain multiple windows associated with a single software program or multiple software programs executing concurrently.

Often when multiple graphical objects are displayed concurrently, the graphical objects will overlap. The order in which graphical objects are drawn on top of one another onscreen to simulate depth is typically known as the z-order of objects along the z-axis. Typically, those objects at the top of the z-axis obscure the view of those graphical objects drawn below.

In some operating systems, a level of translucency may be applied to graphical objects, and in particular to windows. By applying a level of translucency to upper level z-order windows, lower level z-order windows are rendered visible through the upper level z-order windows. Utilizing translucency is particularly advantageous such that the title bars for multiple z-order levels of windows are visible where the windows overlap.

However, as the number of translucent windows increases in a display area, the ability to distinguish between layers of translucent text becomes increasing more difficult. Further, even though it may be advantageous to display translucent layers of windows, a user may also have preferences to selectively view opaque windows. In U.S. Pat. No. 5,651,107, additional scroll bars are applied to each window in order for a user to select between various levels of translucency. However, translucency adjustable scroll bars are limited in that the translucency of a window as designated by adjusting a scroll bar does not provide information about the window. For example, the recent use of the window is not represented by the transparency once adjusted with a scroll bar.

In view of the foregoing, it would be advantageous to provide a method, system, and program for selectively adjusting the translucency of windows without adjusting the z-order. Further, it would be advantageous to provide a method, system, and program for selectively adjusting the transparency of windows according to a particular criteria, such as most recently used.

SUMMARY OF THE INVENTION

In view of the foregoing, it is therefore an object of the present invention to provide an improved computer system.

It is another object of the present invention to provide an improved graphical user interface.

It is yet another object of the present invention to provide a method, system and program for selectively adjusting the transparency of windows within a user interface.

According to one aspect of the present invention, an n-level is determined within a z-order of at least one displayable object from among multiple displayable objects distributed within the z-order. A transparency level is selectively adjusted of the at least one displayable object within a user interface positioned at the n-level within the z-order, such that the transparency level of the at least one displayable object is selectively adjusted without adjusting the z-order of the displayable objects A flashlight tool may be positioned in association with a particular displayable object within the user interface, wherein the transparency of the particular displayable object is selectively adjusted according to the position of the flashlight tool. An n-level and transparency may be set for the flashlight tool.

A z-order listing of the at least one displayable object according to a particular criteria may be displayed. The n-level of the displayable object to be selectively adjusted in transparency may be determined by the position of a slider bar in correlation with the z-order listing.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 illustrates a graphical representation of a transparency selection window in accordance with the method, system, and program of the present invention.

DETAILED DESCRIPTION OF THE PREFERRED EMBODIMENT

Figure 1:
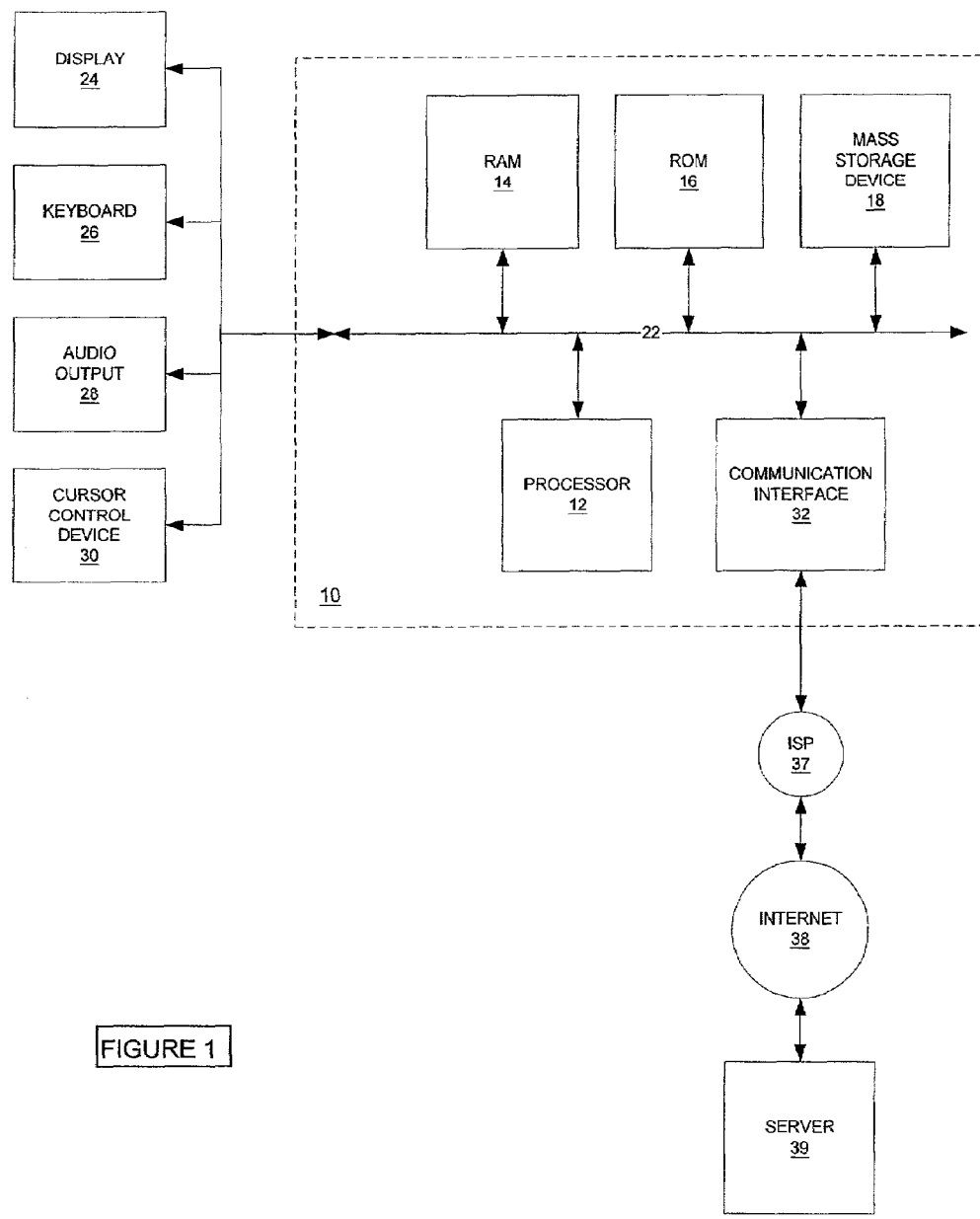
FIG. 1 depicts one embodiment of a computer system with which the method, system and program of the present invention may advantageously be utilized.

A method, system, and program for selectively adjusting the transparency of windows without effecting the z-order of the windows are provided. In addition to windows, the transparency of other displayable objects may be adjusted without effecting the z-order of those displayable objects. A "displayable object" may include text, icons, video, graphics, windows, or other logical graphical representations displayable within a display area. Displayable objects may be hidden or visible. Further, displayable objects may be layered in a z-order. Moreover, a displayable object may utilize a portion of a display area or may extend across the entirety of a display area.

According to one advantage of the present invention, a flashlight cursor may be utilized to selectively adjust the transparency of displayable objects. A "flashlight cursor" is advantageously a cursor adjusted to act as a translucent flashlight. Traditionally, a cursor is displayed as an arrow or text bracket. The flashlight cursor may be displayed as an arrow, text, a flashlight, or other displayable icon where the screen position may be adjusted by the user input. Advantageously, a user may assign a translucency or opaqueness to the flashlight cursor. In particular, translucency or opaqueness may include a selection of color and hue.

Further, a user may select the portion of area for the flashlight cursor to be effective within. For example, the user may select for the flashlight cursor to effect the translucency for the entire displayable object or objects over which the flashlight cursor is positioned. In addition, the user may specify for translucency to be adjusted when the flashlight is positioned over displayable objects meeting a particular criteria. Alternatively, the user may define a particular sized beam around the flashlight cursor where the translucency will be adjusted. Further, the user may select to adjust the n-level within the z-order of the flashlight cursor such that the flashlight cursor may shine a more opaque light on a particular n-level of displayable objects.

A z-order is the order along the z-axis in which displayable objects appear. Through a z-buffering technique, a depth is associated with each displayable object such that each object appears to be set at a particular depth in comparison with other displayable objects. There may be n-levels of layers within the z-order, where multiple displayable objects may be positioned within a particular n-level of the z-order.

The z-order may be a result of the order in which a user opens displayable objects onto the display. Alternatively, according to one advantage of the present invention, a user may designate for the z-order to be set according to a particular criteria.

Transparency is a graphical feature that is particularly advantageous to the present invention when displaying multiple displayable objects within a user interface where those displayable objects may overlap. As will be understood by one skilled in the art, by making a displayable object appear transparent on a computer screen, displayable objects below that transparent displayable object are rendered visible through the transparent displayable object. Further, the transparency of a displayable object may be adjusted from opaque to totally transparent.

Typically, the transparency attribute is stored with color values in an alpha channel. Then, when calculating the appearance of a given pixel, the graphic processor uses the alpha channel values to determine the pixel's color through a process termed alpha blending. Through alpha blending, the process adds a fraction of the color of the transparent object set by the alpha channel value to the color of the displayable object below. Mixing the colors together gives the appearance that the displayable object below is seen through a layer of the transparent displayable object. In addition to alpha blending, additional shading may be added to create shadows and other graphical images to cue the viewer to the position of the transparent displayable object.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIG. 9 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communication interface 32, which carry the digital or analog data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. Keyboard 26 and cursor control device 30 can control the position of a cursor positioned within a display area of display 24. It should be understood that keyboard 26 and cursor control device 30 are examples of multiple types of input devices that may be utilized in the present invention. In alternate embodiments of the present invention, additional input and output peripheral components may be added.

Selective Translucency Context

Figure 2:
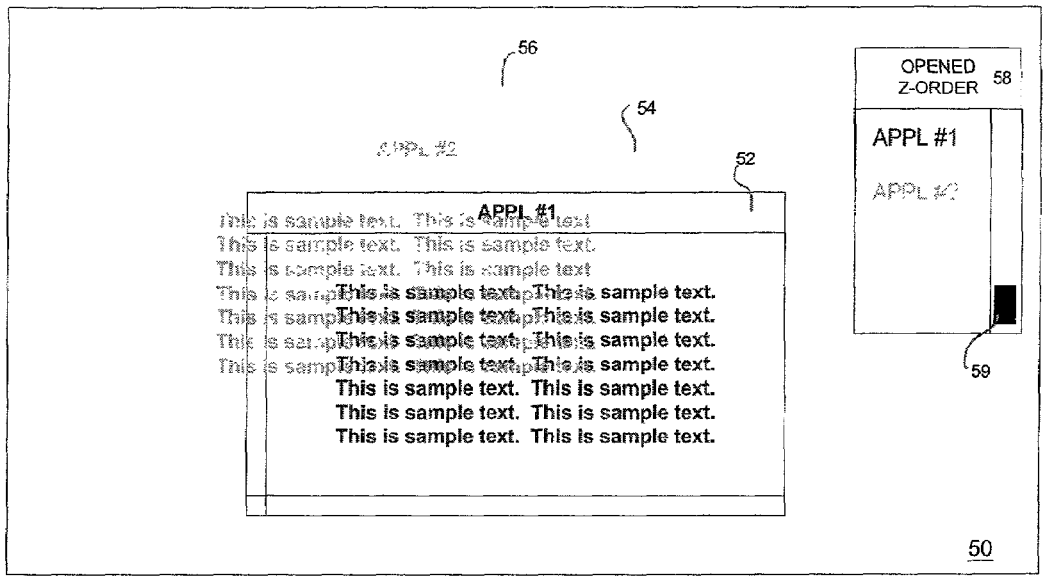
FIG. 2 illustrates a graphical representation of a user interface where a z-order listing for multiple windows is illustrated in accordance with the method, system, and program of the present invention.

Referring now to FIG. 2, there is depicted a graphical representation of a user interface where a z-order listing for multiple windows is illustrated in accordance with the method, system, and program of the present invention. As illustrates, a user interface 50 includes windows 52, 54, and 56. In the present example, window 52 is positioned at the top level of the z-order, followed in position by window 54, and then window 56.

As depicted, each of windows 52, 54, and 56 are each set at a particular level of transparency such that text from window 56, at the lowest level of the z-order, is visible through window 52, at the highest level of the z-order.

According to one advantage of the present invention, a z-order window 58 depicts the current z-order of windows 52, 54, and 56. In the present example, each of windows 52, 54, and 56 is represented by the title of the window and the z-order is designated according to the order in which a user opened windows within user interface 50. In alternate embodiments, the z-order may be designated according to alternate criteria. In addition, in alternate embodiments, multiple types of displayable objects, in addition to windows, may be displayed.

Preferably, there are n-levels within each z-order where each window or other displayable object is associated with one of the n-levels. In addition, although not depicted, multiple windows may be positioned in parallel within a single n-level of the z-order.

As illustrated, where multiple transparent window 52, 54, and 56 are depicted, it becomes difficult to view the contents of each window independently. Therefore, according to one advantage of the invention, the user may selectively adjust the transparency of windows 52, 54, and 56 without adjusting the actual z-order of the windows.

According to one aspect of the invention, a user may utilize a cursor 43 to select the position of slider bar 59 in relation to the window names within z-order window 58. In the present example, slider bar 59 is not positioned in relation to any of the window names within z-order window 58. However, as depicted in FIG. 3, when slider bar 59 is positioned in association with a window name, that window adjusts in transparency without adjusting the z-order of the windows.

Advantageously, the user may indicate the transparency associated with slider bar 59. For example, a user may want to make a window more transparent by the position of slider bar 59. Alternatively, a user may want to make a window more opaque by the position of slider bar 59.

In addition, advantageously, the transparency of the window names within z-order window 58 may be adjusted to reflect the actual transparency of each window. Further, by placing cursor 43 over one of the window names, a pop-up window preferably indicates the transparency level of the associated window.

Figure 3:
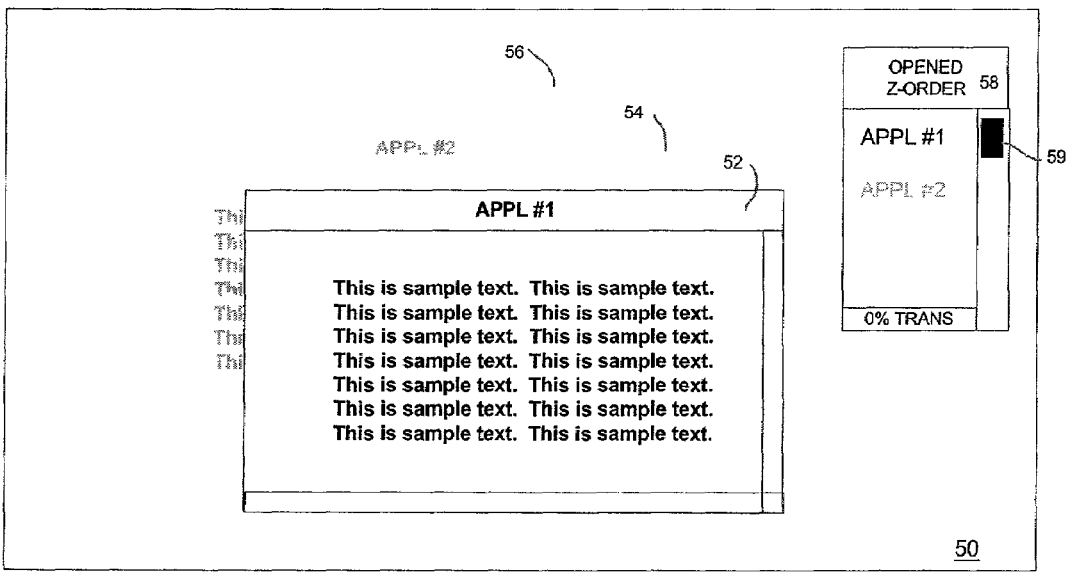
FIG. 3 depicts a graphical representation of a user interface in which the transparency of a window within the user interface is selectively adjusted in accordance with the method, system, and program of the present invention.

With reference now to FIG. 3, there is illustrated a graphical representation of a user interface in which the transparency of a window within the user interface is selectively adjusted in accordance with the method, system, and program of the present invention. As depicted, slider bar 59 is positioned in association with "APPL #1", which corresponds to window 52. The transparency of window 52 is selectively adjusted according to the position of slider bar 59 to complete opacity (0% transparent), such that the contents of window 52 are more easily viewable. Advantageously, as a user selects to reposition slider bar 59 in association with other windows, those windows will adjust in transparency, however not change in z-order, as will be further described.

Figure 4:
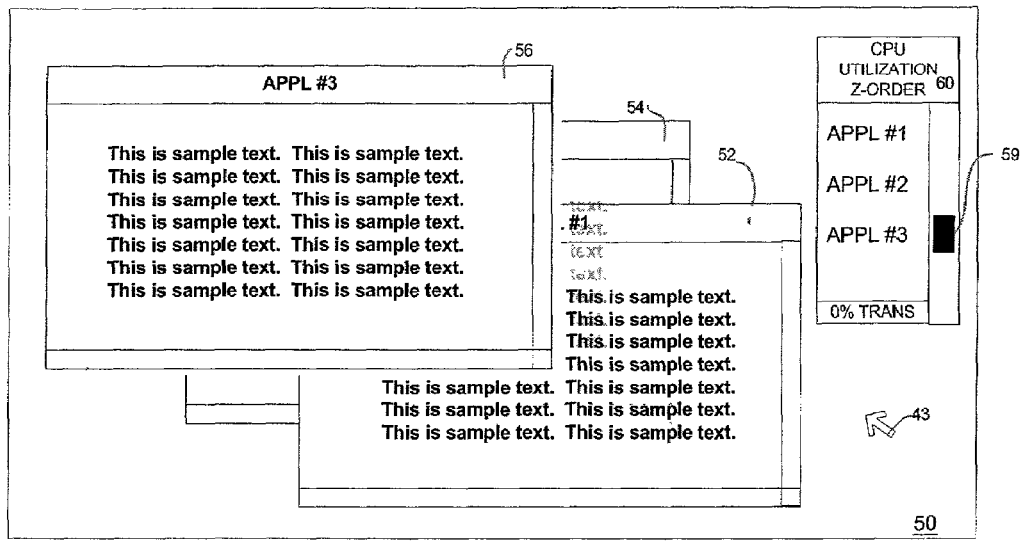
FIG. 4 illustrates a graphical representation of a user interface in which the z-order listing of the windows has been set according to a particular criteria in accordance with the method, system, and program of the present invention.

Referring now to FIG. 4, there is depicted a graphical representation of a user interface in which the z-order listing of the windows has been set according to a particular criteria in accordance with the method, system, and program of the present invention. As illustrated, a listing of displayable objects within z-order window 60 is ordered according to CPU utilization. Advantageously, as depicted in the present example, a user may designate a criteria for sorting a z-order listing, however the actual z-order of the windows will not adjust. The z-order listing just gives the order in which windows would appear if ordered according to a particular criteria. Alternatively, a user may request that the actual z-order of the windows also adjust according to the listing.

In the present example, a user has positioned slider bar 59 in association with "APPL #3" which corresponds to window 56. Therefore, as illustrated, window 56 is selectively adjusted to a greater opacity. By selectively adjusting the opacity of window 56, a user may more easily view the contents of the window with the greatest CPU utilization without actually adjusting the z-order of the windows. Upon viewing the contents of window 56, a user may then decide to select window 56 with cursor 43 or through another method, thus adjusting the actual z-order of the windows.

While in the present embodiment a single z-order listing is depicted within a user interface, in alternate embodiments, multiple z-order screens, each with listings ordered according to an independent criteria may be utilized within a single user interface. In addition, while in the present embodiment windows are selectively adjusted in transparency according to the position of the slider bar, in alternate embodiments, alternate types of graphical tools may be utilized for selecting which window is to be adjusted in transparency. In addition, additional graphical aids may be added to the user interface to aid the user in viewing the transparency adjustment. For example, it may appear as if a flashlight is being moved along the z-axis of the display area, where in response windows selectively adjust in transparency.

Figure 5:
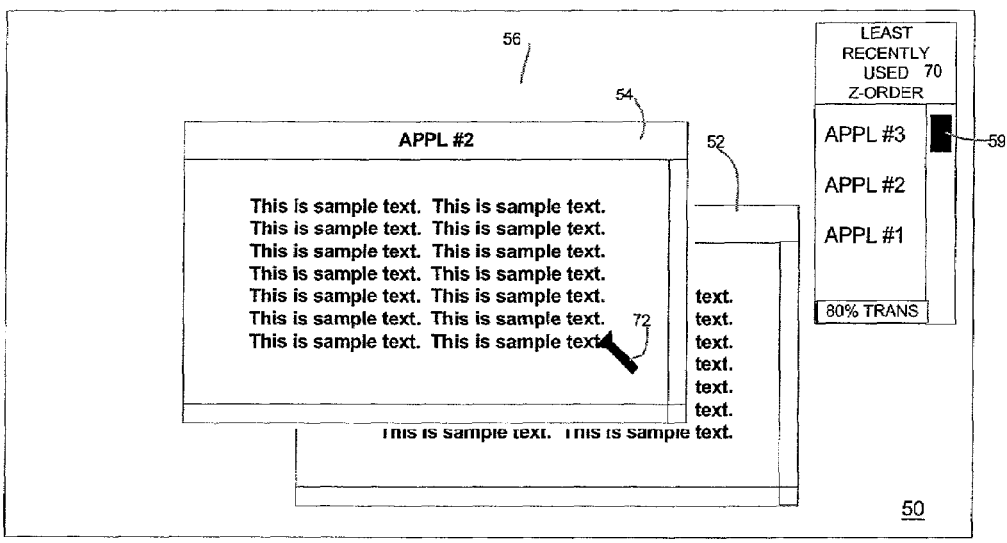
FIG. 5 depicts a graphical representation of a user interface wherein a flashlight tool selectively adjusts the transparency of a window in accordance with the method, system, and program of the present invention.

With reference now to FIG. 5, there is illustrated a graphical representation of a user interface wherein a flashlight tool selectively adjusts the transparency of a window in accordance with the method, system, and program of the present invention. As depicted, a listing within z-order window 70 depicts the windows in the order from least recently utilized to most recently utilized. Scroll bar 59 is positioned in association with "APPL #3" which corresponds to window 56. Therefore, window 56 is made selectively adjusted according to the position of scroll bar 59 to be more transparent.

Advantageously, a criteria may be set by a user to be applied to a flashlight cursor such that as the flashlight cursor is moved across the user interface, windows meeting the criteria are selectively adjusted in transparency.

In the present example, the position of a flashlight cursor 72 selectively adjusts the transparency of window 54 according to a criteria. In this example, the criteria set for flashlight cursor 72 is sound card utilization greater than 50%. As flashlight cursor 72 moves within user interface 50, window 54 is made more opaque to depict that window 54 has more than 50% utilization of the sound card. Alternate types of criteria may include, but are not limited to including, a particular n-level or levels within the z-order, time criteria, resource usage criteria, and other criteria measured by the system according to window.

In an alternate embodiment of the present invention, the flashlight cursor may automatically display over the window that meets the criteria. Still in another alternate embodiment, the window that meets the criteria may be selectively adjusted in transparency without the addition of a flashlight tool.

In addition, while in the present example the criteria set for flashlight cursor 72 only applies to window 54, in alternate embodiments, multiple windows may meet the criteria. Where multiple windows meet the criteria set for the flashlight cursor, the transparency of multiple windows may concurrently adjust according to the position of the flashlight cursor.

Figure 6:
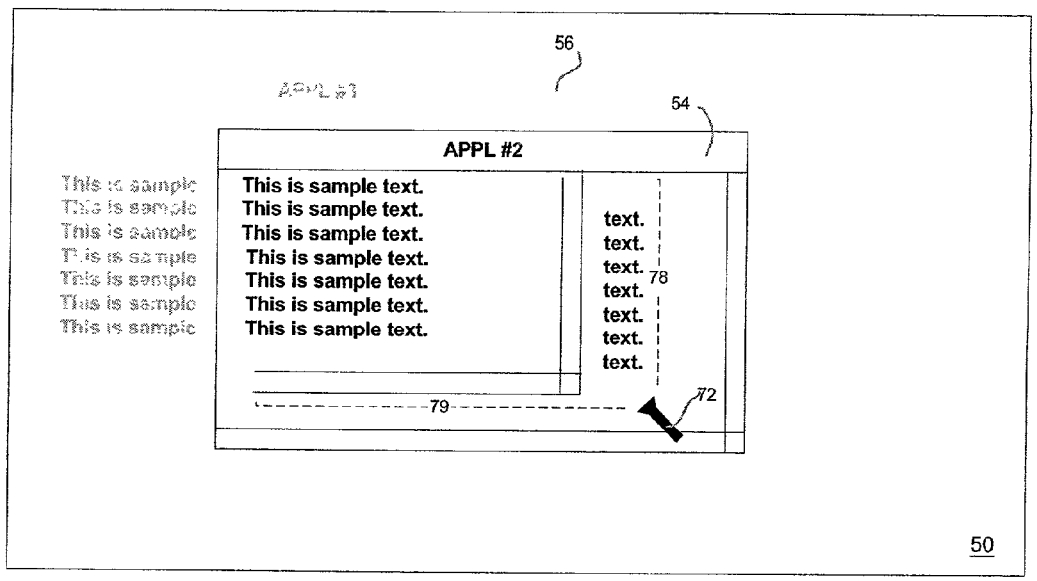
FIG. 6 illustrates a graphical representation of a user interface wherein a flashlight tool is set to an n-level in accordance with the method, system, and program of the present invention.

Referring now to FIG. 6, there is depicted a graphical representation of a user interface wherein a flashlight tool is set to an n-level in accordance with the method, system, and program of the present invention. As illustrated, flashlight cursor 72 has a beam size as indicated by vertical boundary 78 and horizontal boundary 79. Advantageously, a user may select the beam size of flashlight cursor 72 or the computer system may select a beam size in perspective of the size of the user interface and displayable objects displayed therein. In particular, the beam may be a single or varying transparency within the beam size or may tapper in transparency at the edges of the beam. Further, alternate shapes of beams may be utilized in alternate embodiments. Moreover, a user may advantageously select the beam size to be the full screen size such that all displayable objects that are on a particular n-level within multiple z-orders may be selectively adjusted in transparency.

Advantageously, in addition to setting a beam size, a user may select an n-level for flashlight cursor 72. The value of the n-level indicates the level within the z-order where the beam of flashlight cursor 72 is to shine in order to selectively adjust transparency of windows.

In the present example, n is set to "2", such that the beam of flashlight cursor 72 shines on windows in the 2nd level of the z-order. As depicted, the contents of z-order level "2" are made more opaque within the area of the beam and remain at a particular transparency outside the beam. In alternate embodiments, multiple windows and graphical images may be placed within the 2nd level of the z-order.

Figure 7:
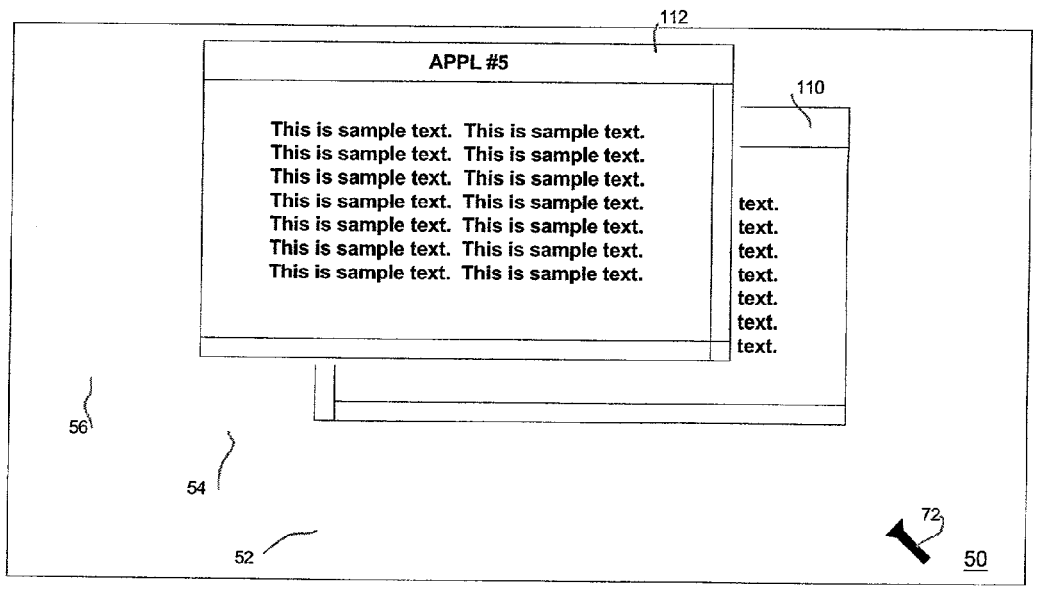
FIG. 7 depicts a graphical representation of a user interface where windows that are completely transparent are searched for in accordance with the method, system, and program of the present invention

With reference now to FIG. 7, there is depicted a graphical representation of a user interface where windows that are completely transparent are searched for in accordance with the method, system, and program of the present invention. As illustrated, a window 110 and a window 112 are presented within display 50. In previous examples, window 110 and window 112 were completely transparent, and therefore hidden from view. Where, for example, windows adjust in transparency according to a criteria, such as least recently used, those windows may remain open, but become completely transparent.

According to one advantage of the present invention, the criteria for flashlight cursor 72 may be set to increase the opaqueness of completely transparent windows that have become hidden from view over time. Therefore, flashlight cursor 72 may be utilized to find hidden windows that remain open. In the example, the transparency of window 57 will adjust as a result of the position of flashlight cursor 72 in relation to window 57.

Referring now to FIG. 8, there is depicted a graphical representation of a transparency selection window in accordance with the method, system, and program of the present invention. As illustrated, a transparency selection window 80 includes z-order criteria selection 82, n-level flashlight selection 84, and flashlight criteria selection 89.

Z-order criteria selection 82 preferably includes criteria for multiple z-order listings and a transparency associated with the scroll bar for each criteria. Advantageously, criteria may include, but is not limited to, utilization of the CPU or CPUs, graphics cards, sound cards, memory, storage devices, net bandwidth, operating system, and other software, hardware, and network elements. Further, criteria may include ordering by size, least recently used, most recently used, recently printed from, recently saved, and other software functions dependent on time and size.

N-level flashlight selection 84 preferably includes a value for n, the beam size, beam shape, and transparency of the beam. Advantageously, a user may create and store particular beam styles for later use and may select from a directory of pre-set beam styles.

Flashlight criteria selection 89 preferably includes criteria for a flashlight with a transparency associated with each criteria. In addition, the criteria may designate whether a flashlight tool should be provided and whether the user should search with the tool or whether the tool should be automatically placed at a displayable object meeting the criteria and shifted to other objects utilizing a key command, voice command, or other entry. In particular, where a flashlight tool is utilized for multiple criteria, a graphical characteristic may be associated with each of the criteria such that the flashlight cursor graphically adjusts to indicate which criteria has been hit.

Figure 9:
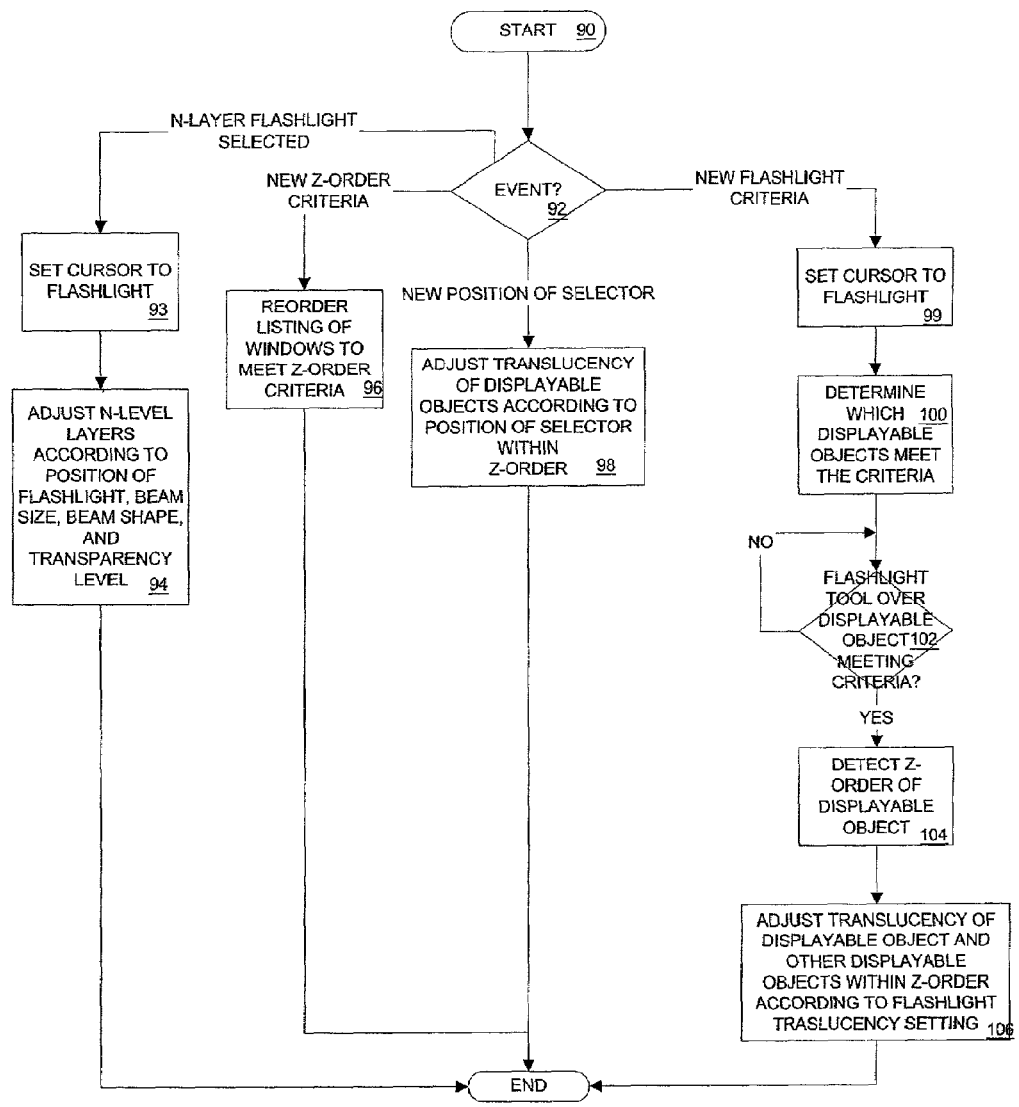
FIG. 9 depicts a high level logic flowchart of a process and program for selectively adjusting transparency of windows without adjusting z-order in accordance with the method, system, and program of the present invention.

With reference now to FIG. 9, there is illustrated a high level logic flowchart of a process and program for selectively adjusting transparency of windows without adjusting z-order in accordance with the method, system, and program of the present invention. As depicted, the process starts at block 90 and thereafter proceeds to block 92. Block 92 depicts a determination as to which event occurred when an event occurs.

At block 92, if an n-level flashlight is selected, then the process passes to block 93. Block 93 depicts setting the cursor to a flashlight tool. Next, block 94 depicts adjusting the nth-level z-order layer according to the position of the flashlight, beam size, and associated transparency level; and the process ends.

Alternatively, at block 92, if a new z-order criteria is received, then the process passes to block 96. Block 96 illustrates reordering the listing of windows to meet the z-order criteria; and the process ends.

As an additional alternative, at block 92, if a new position of a selector is received, then the process passes to block 98. A selector may include a scroll bar and other adjustable displayable objects that indicate which window is to be selectively adjusted in transparency. The n-level of the selected displayable object is determined with the new position of the selector such that the transparency of that level within the z-order can be adjusted. In particular, where multiple z-orders of displayable objects are depicted within a user interface, the transparency of all displayable objects within that n-level may need to be adjusted to maintain the view of the depths of the displayable objects. Block 98 depicts adjusting the translucency of the selected displayable object and any other necessary displayable objects, including a window, according to the position of the selector within the z-order listing; and the process ends.

Finally, at block 92, if a new flashlight criteria is received, then the process passes to block 99. Block 99 depicts setting the cursor to a flashlight tool. Next, block 100 illustrates determining which displayable objects, including windows, meet the criteria. Thereafter, block 102 depicts a determination as to whether or not the flashlight tool is moved over a displayable object meeting the criteria. If the flashlight tool is not moved over a displayable object meeting the criteria, then the process iterates at block 102. If the flashlight tool is moved over a displayable object meeting the criteria, then the process passes to block 104.

Block 104 illustrates detecting the z-order of the displayable object meeting the criteria. In detecting the z-order of the displayable object meeting the criteria, in particular, the n-level of that displayable object within the z-order is determined. Next, block 106 depicts adjusting the translucency of the displayable object and other displayable objects within the z-order according to the flashlight translucency setting; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for selectively adjusting a transparency of a displayable object within a user interface using a flashlight tool, said method comprising the steps of:
    enabling a flashlight tool;
    selecting an operating criteria of said flashlight tool by receiving a user selection criteria for said flashlight tool such that said flashlight tool is effective on at least one displayable object that meets said user selection criteria;
    positioning said flashlight tool at a location within a user interface by:
        setting said flashlight tool to be operative on said at least one displayable object that meets said user selection criteria;
        operating said flashlight tool to locate said at least one displayable object that meets said user selection criteria; and positioning said flashlight tool at a location over said at least one displayable object that meets aid user selection criteria; and selectively adjusting a transparency level of said at least one displayable object within said user interface, such that said transparency level of said at least one displayable object is selectively adjusted according to said operating criteria of said flashlight tool.

2. The method for selectively adjusting a transparency of a displayable object according to claim 1, said step of selecting an operating criteria of said flashlight tool further comprises:

receiving a specified user selection of an n-level within a z-order from among a plurality of displayable objects, as a setting for said flashlight tool such that said flashlight tool setting at said n-level is operative on at least one displayable object within said n-level; and setting said flashlight tool to be operative on said at least one displayable object within said n-level.

3. The method for selectively adjusting a transparency of a displayable object according to claim 1, said step of selecting an operating criteria of said flashlight tool further comprises:

receiving a specified user selection of a flashlight beam for setting said flashlight tool such that said flashlight tool is effective on at least one displayable object within a range of said specified flashlight beam;

receiving a specified user selection for setting the intensity of said flashlight beam;

receiving a specified user selection for setting the shape of said flashlight beam; and setting said flashlight tool to be operative with said intensity, and with said shape, on said at least one displayable object within said range of said flashlight beam.

4. The method for selectively adjusting a transparency of a displayable object according to claim 3, said method further comprising the step of:

receiving a specified user selection for setting said flashlight beam to effect a varying degree of transparency on said at least one displayable object.

5. The method for selectively adjusting a transparency of a displayable object according to claim 1, said step of selecting the operating criteria of said flashlight tool further comprises:

receiving a user selection criteria for said flashlight tool such that said flashlight tool is effective on at least one displayable object that meets said user selection criteria; and setting said flashlight tool to be operative on said at least one displayable object that meets said user selection criteria.

6. The method for selectively adjusting a transparency of a displayable object according to claim 1, said step of selectively adjusting a transparency level further comprises:

adjusting a transparency level of said at least one displayable object within said user interface in response to moving said flashlight tool across said user interface.

7. The method for selectively adjusting a transparency of a displayable object according to claim 1, said step of selectively adjusting a transparency level, further comprising the step of:

selectively adjusting a transparency level of said at least one displayable object according to a transparency designated for a flashlight tool positioned to selectively adjust said transparency level of said at least one displayable object.

8. A system for selectively adjusting a transparency of a displayable object within a user interface using a flashlight tool, said system comprising:

a graphical user interface;

means for enabling a flashlight tool;

means for selecting an operating criteria of said flashlight tool by receiving a user selection criteria for said flashlight tool such that said flashlight tool is effective on at least one displayable object that meets said user selection criteria;

means for positioning said flashlight tool at a location within a user interface by:

setting said flashlight tool to be operative on said at least one displayable object that meets said user selection criteria;

operating said flashlight tool to locate said at least one displayable object that meets said user selection criteria; and positioning said flashlight tool at a location over said at least one displayable object that meets aid user selection criteria; and means for selectively adjusting a transparency level of said at least one displayable object within said user interface, such that said transparency level of said at least one displayable object is selectively adjusted according to said operating criteria of said flashlight tool.

9. The system for selectively adjusting a transparency of a displayable object according to claim 8, said means for selecting the operating criteria of said flashlight tool further comprising means for receiving a specified user selection of an n-level within a z-order from among a plurality of displayable objects, as a setting for said flashlight toot such that said flashlight tool setting at said n-level is operative on at least one displayable object within said n-level; and means for setting said flashlight tool to be operative on said at least one displayable objects within said n-level.

10. The system for selectively adjusting a transparency of a displayable object according to claim 8, said means for selecting the operating criteria of said flashlight tool further comprising:

means for receiving a specified user selection of said flashlight beam for setting said flashlight tool such that said flashlight tool is effective on at least one displayable object within a range of said specified flashlight beam;

means for receiving a specified user selection for setting the intensity of said flashlight beam;

means for receiving a specified user selection for setting the shape of said flashlight beam; and means for setting said flashlight tool to be operative with said intensity, and with said shape, on said at least one displayable object within said range of said flashlight beam.

11. The system for selectively adjusting a transparency of a displayable object according to claim 10, further comprising:

means for receiving a specified user selection for setting said flashlight beam to effect a varying transparency of said at least one displayable object.

12. The system for selectively adjusting a transparency of a displayable object according to claim 8, said system further comprising:

means for receiving a user selection criteria for said flashlight tool such that said flashlight tool is effective on at least one displayable object that meets said user selection criteria; and means for setting said flashlight tool to be operative on said at least one displayable object that meets said user selection criteria.

13. The system for selectively adjusting a transparency of a displayable object according to claim 8, said means for selectively adjusting a transparency level further comprising:

means for adjusting a transparency level of said at least one displayable object within said user interface in response to moving said flashlight tool across said user interface.

14. The system for selectively adjusting a transparency of a displayable object according to claim 8, said means for selectively adjusting a transparency level further comprising:

means for selectively adjusting a transparency level of said at least one displayable object according to a transparency designated for a flashlight tool positioned to selectively adjust said transparency level of said at least one displayable object.

15. A program for selectively adjusting a transparency of a displayable object within a user interface using a flashlight tool, residing on a tangible computer usable medium having computer readable program code means, said program comprising:

means for enabling a flashlight tool;

means for selecting an operating criteria of said flashlight tool by receiving a user selection criteria for said flashlight tool such that said flashlight tool is effective on at least one displayable object that meets said user selection criteria;

means for positioning said flashlight tool at a location within a user interface by:

setting said flashlight tool to be operative on said at least one displayable object that meets said user selection criteria;

operating said flashlight tool to locate said at least one displayable object that meets said user selection criteria; and positioning said flashlight tool at a location over said at least one displayable object that meets aid user selection criteria; and means for controlling a transparency level of said at least one displayable object within said user interface, such that said transparency level of said at least one displayable object is selectively adjusted according to said operating criteria of said flashlight tool.

16. The program for selectively adjusting a transparency of a displayable object according to claim 15, said program further comprising:

means for receiving a specified user selection of an n-level within a z-order from among said plurality of displayable objects as a setting for said flashlight tool such that said flashlight tool setting at said n-level is operative on al lest one displayable object within said n-level; and means for setting said flashlight tool to be operative on said at least one displayable object within said n-level.

17. The program for selectively adjusting a transparency of a displayable object according to claim 15, said program further comprising:

means for receiving a specified user selection of a flashlight beam for setting said flashlight tool such that said flashlight tool is effective on at least one displayable object within a range of said specified flashlight beam;

means for receiving a specified user selection for setting the intensity of said flashlight beam;

means for receiving a specified user selection for setting the shape of said flashlight beam; and means for setting said flashlight tool to be operative with said intensity, and with said shape, on said at least one displayable object within said range of said flashlight beam.

18. The program for selectively adjusting a transparency of a displayable object according to claim 17, said program further comprising:

means for receiving a user selection criteria for said flashlight tool such that said flashlight tool is effective on said at least one displayable object that meets said user selection criteria; and means for setting said flashlight tool to be operative on said at least one displayable object that meet said user selection criteria.

19. The program for selectively adjusting a transparency of a displayable object according to claim 15, said program further comprising:

means for adjusting a transparency level of said at least one displayable object within said user interface in response to moving said flashlight tool across said user interface.

20. The program for selectively adjusting a transparency of a displayable object according to claim 15, said program further comprising:

means for controlling a transparency level of said at least one displayable object according to a transparency designated for a flashlight tool positioned to selectively adjust said transparency level of said at least one displayable object.

\* \* \* \* \*